Figure 1:
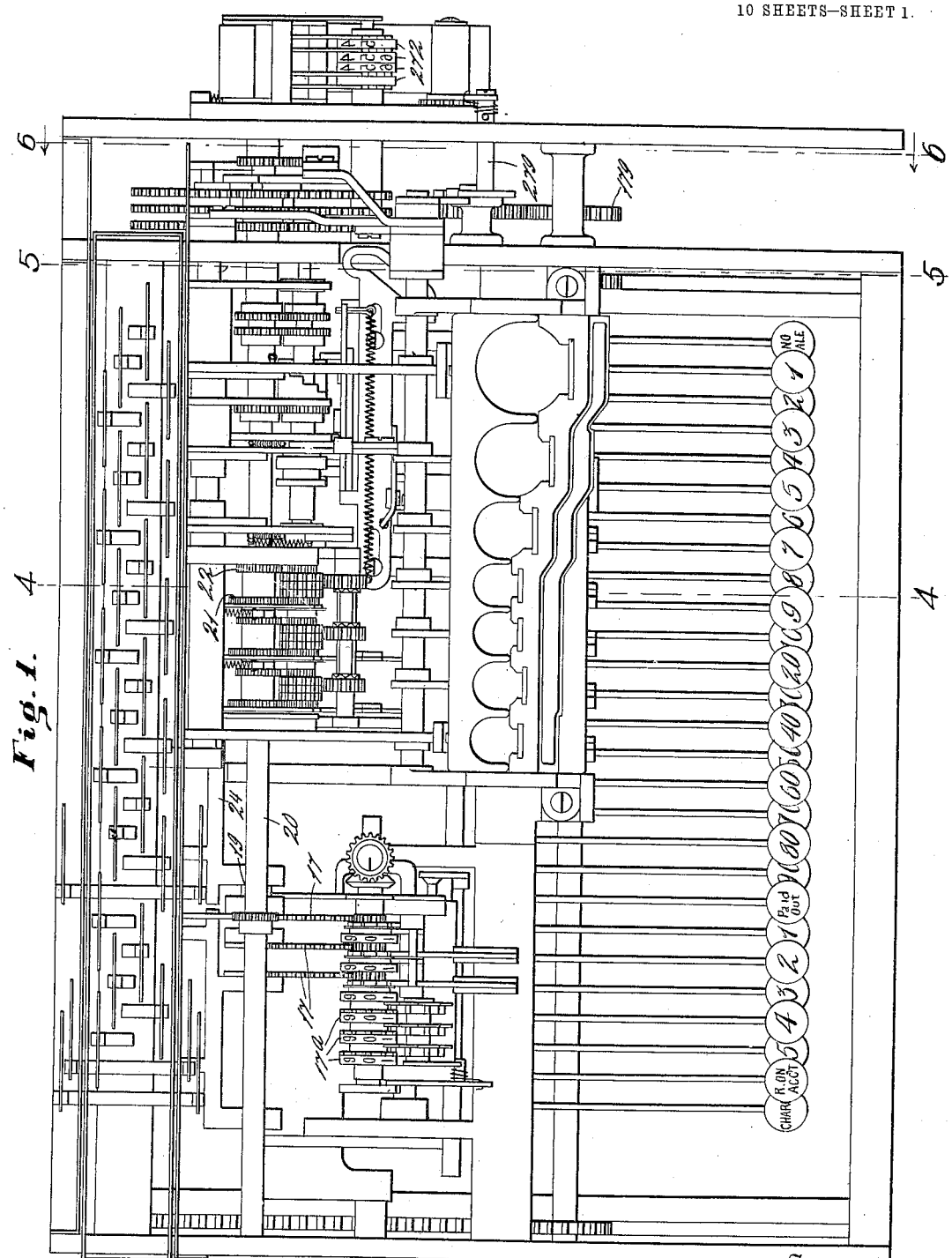

E. J. VON PEIN.
CHANGE MAKING CASH REGISTER.
APPLICATION FILED JUNE 29, 1907.

1,034,500.

Patented Aug. 6, 1912.
10 SHEETS—SHEET 1.

Witnesses

Inventor
Edward J. Von Pein
by J. B. Hayward
and R. D. Glass
Attorneys

E. J. VON PEIN.
CHANGE MAKING CASH REGISTER.
APPLICATION FILED JUNE 29, 1907.

1,034,500.

Patented Aug. 6, 1912.
10 SHEETS—SHEET 4.

E. J. VON PEIN.
CHANGE MAKING CASH REGISTER.
APPLICATION FILED JUNE 29, 1907.

1,034,500.

Patented Aug. 6, 1912.
10 SHEETS—SHEET 7.

Witnesses

Inventor
Edward J. Von Pein
by J. B. Hayward
and R. Elslass
Attorneys

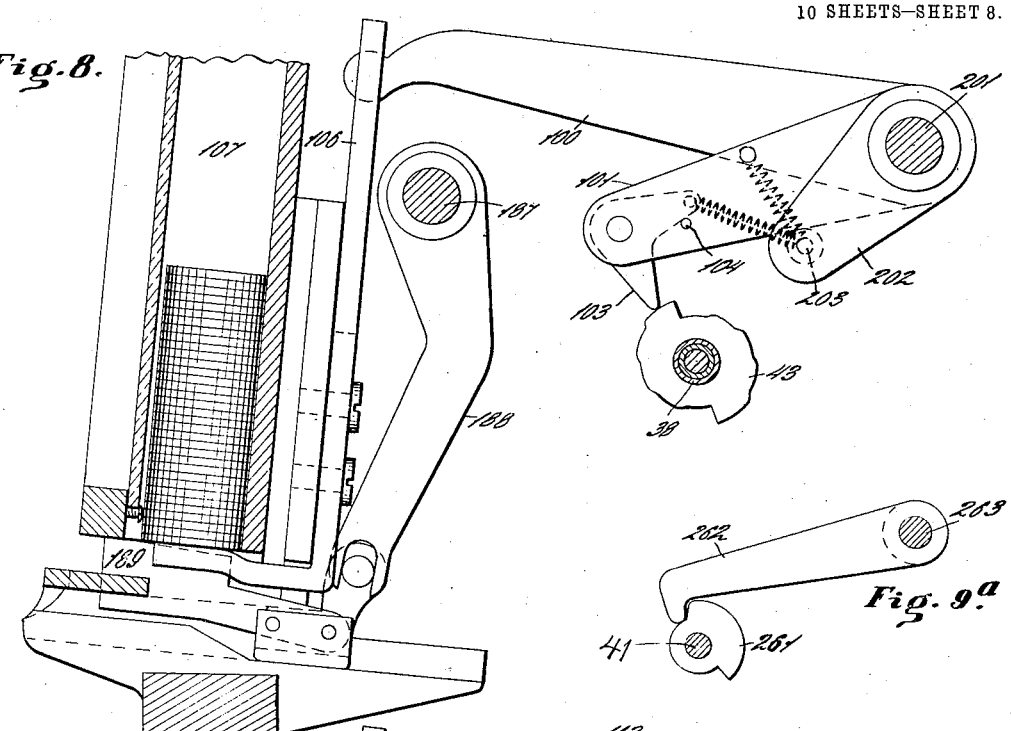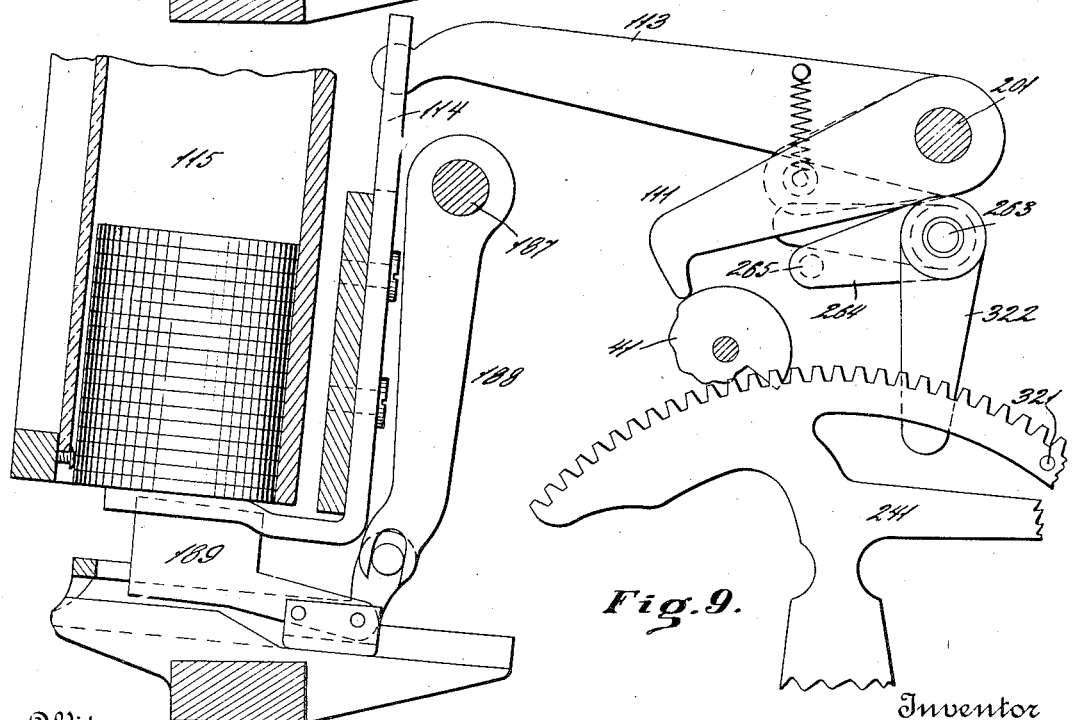

E. J. VON PEIN.
CHANGE MAKING CASH REGISTER.
APPLICATION FILED JUNE 29, 1907.
1,034,500.
Patented Aug. 6, 1912.
10 SHEETS—SHEET 9.
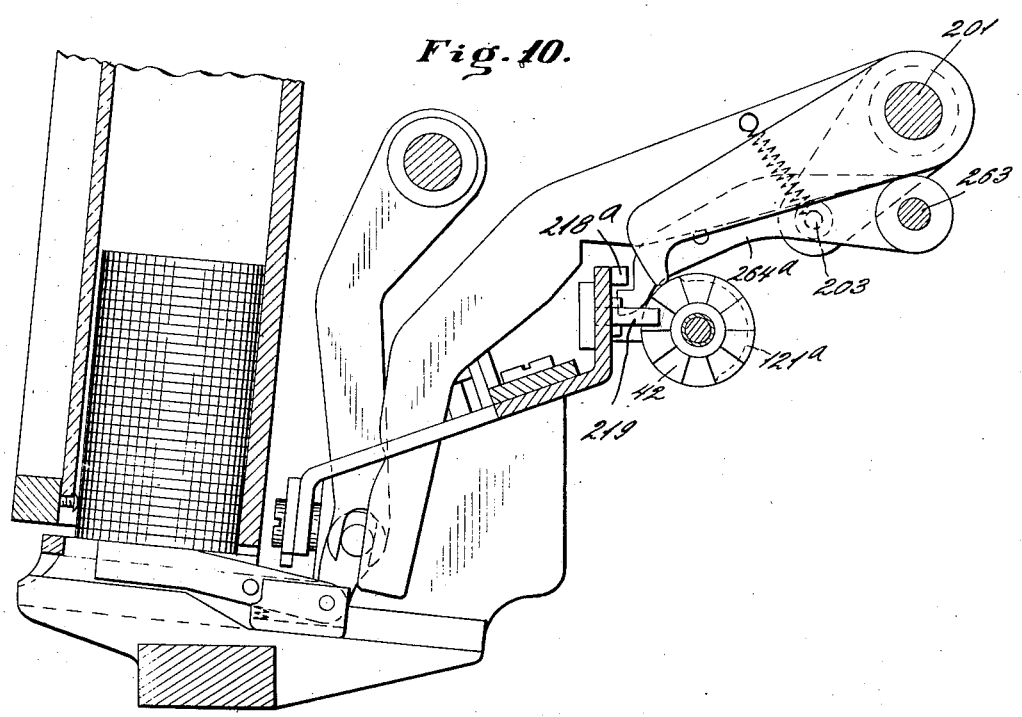
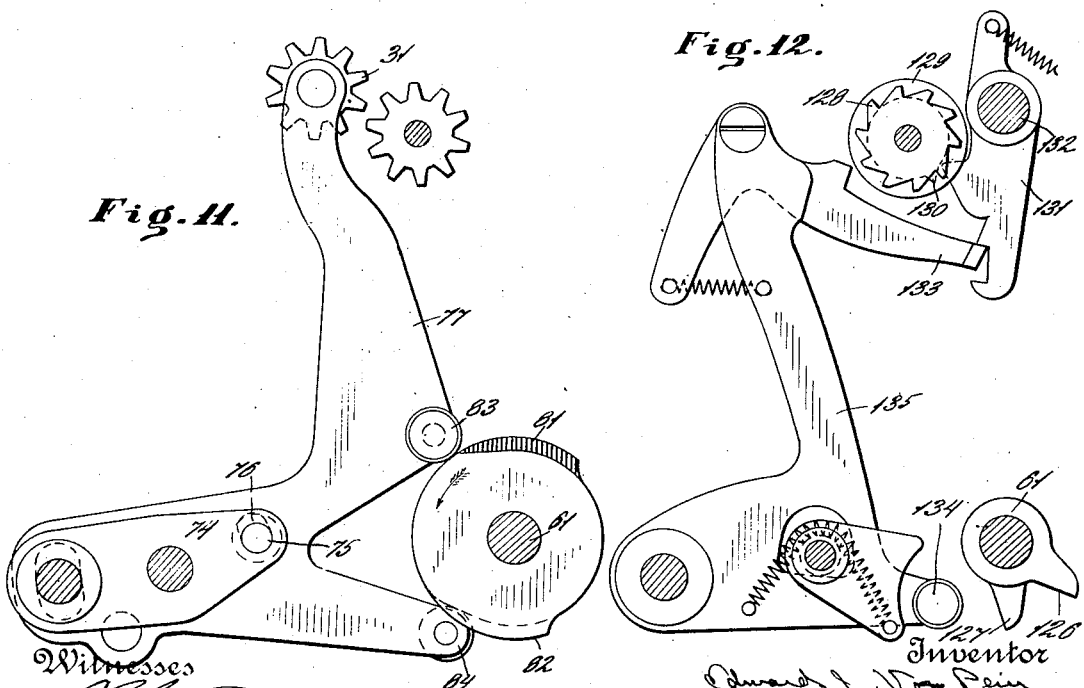

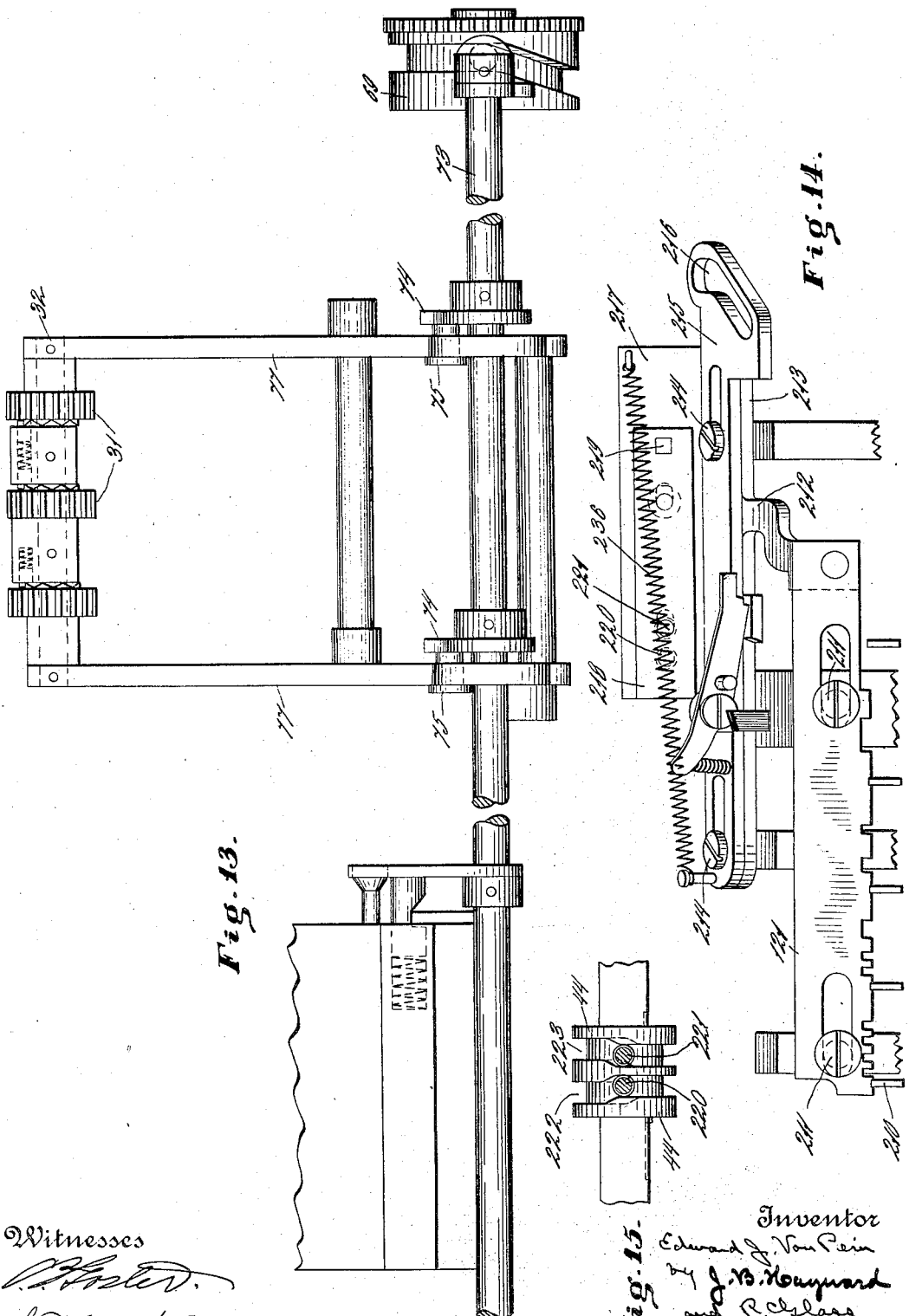

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CHANGE-MAKING CASH-REGISTER.

1,034,500.

Specification of Letters Patent.

Patented Aug. 6, 1912.

Application filed June 29, 1907. Serial No. 381,410.

*To all whom it may concern:*

Be it known that I, EDWARD J. VON PEIN, a citizen of the United States, residing at Dayton, in the county of Montgomery and State of Ohio, have invented certain new and useful Improvements in Change-Making Cash-Registers, of which I declare the following to be a full, clear, and exact description.

This invention relates to machines for automatically computing and ejecting change, and has for its main object to provide an improved construction of such a type of machine. As the mechanism is shown a cash register is connected thereto, but the invention is complete and useful without the cash register, although with the use of the cash register the additional function of keeping track of the amounts of sales may be performed.

Another object is to provide a change making machine having one set only of manipulative devices, these devices serving to control the mechanism in accordance with both the deposit and the purchase amounts.

Another object is to provide selectors for automatically determining the amount of change to be ejected, these selectors being controlled successively in opposite senses at successive operations of the manipulative devices.

A further object is to provide an improved change making mechanism wherein the operation of the change delivering or ejecting devices is controlled by a main operating device, such for example, as a cash receptacle having a movable part.

A further object is to provide a mechanism which will prevent the delivery of any change if the purchase amount indicated on the manipulative devices is higher than the deposit amount, also indicated on said devices.

An additional object is to provide an improved construction of selecting device for delivering five cent coins or nickels, whereby the nickel mechanism is in effect made part of the dimes denomination selecting mechanism.

With these and incidental objects in view, the invention consists in certain novel features of construction and combination of parts, the essential elements of which are set forth in appended claims and a preferred form of embodiment of which is hereinafter described with reference to the drawings which accompany and form part of this specification.

Figure 2:
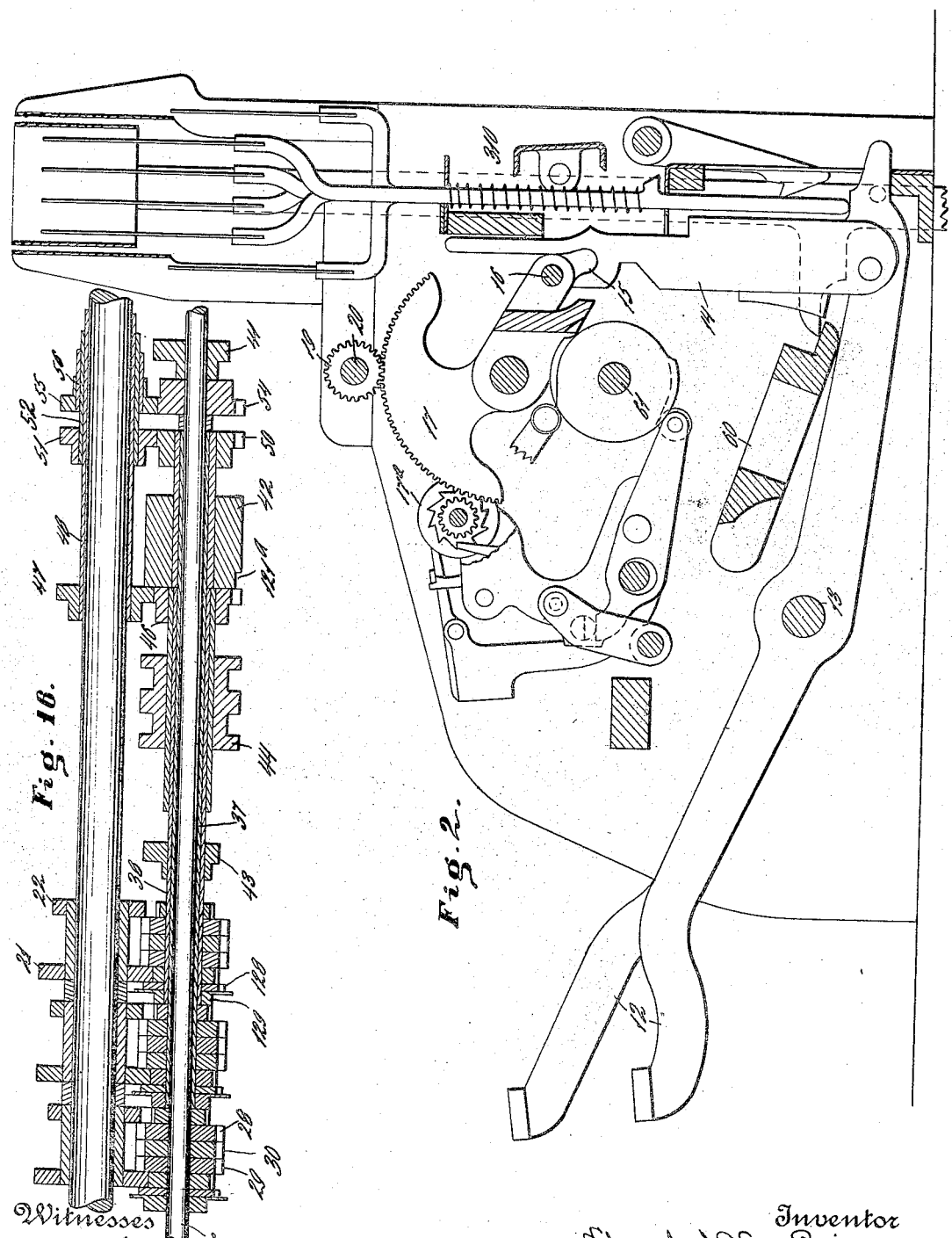
Figure 3:
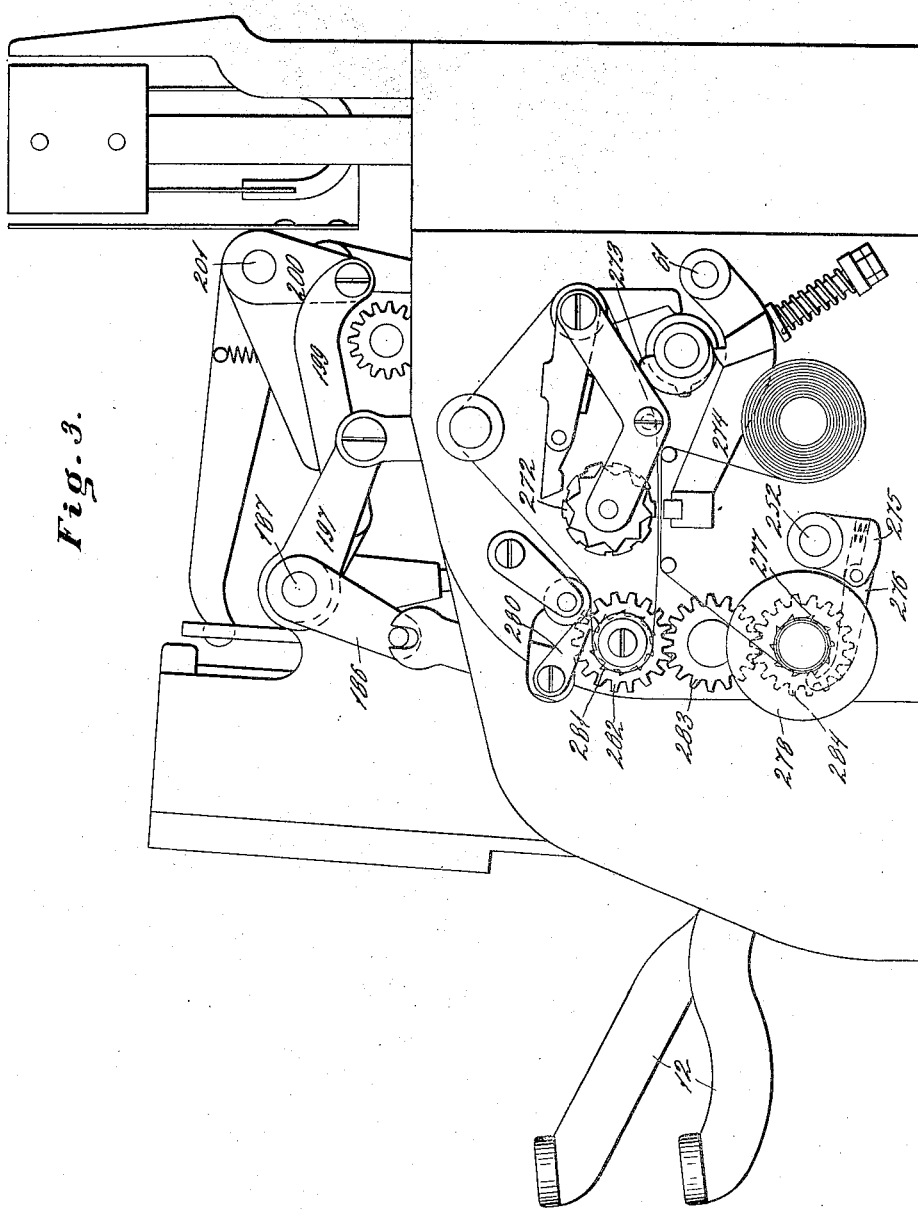
Figure 4:
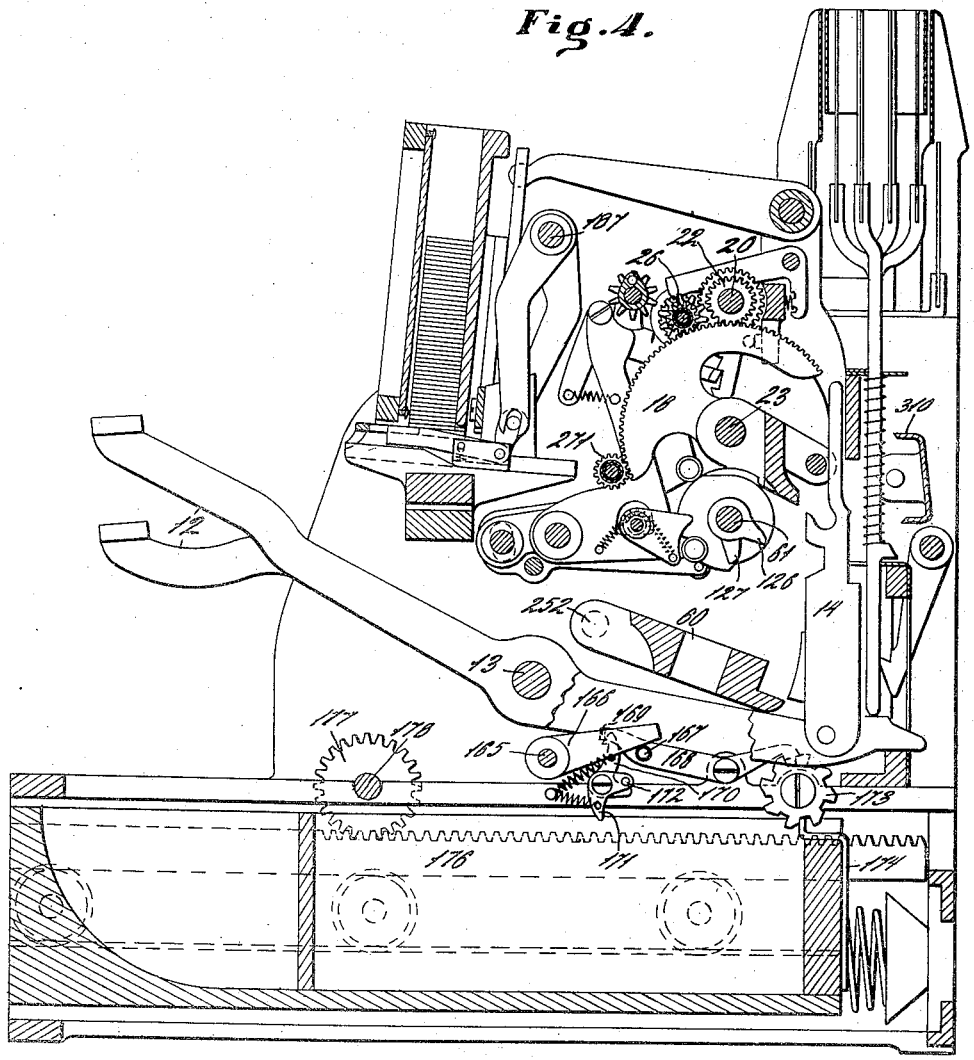
Figure 5:
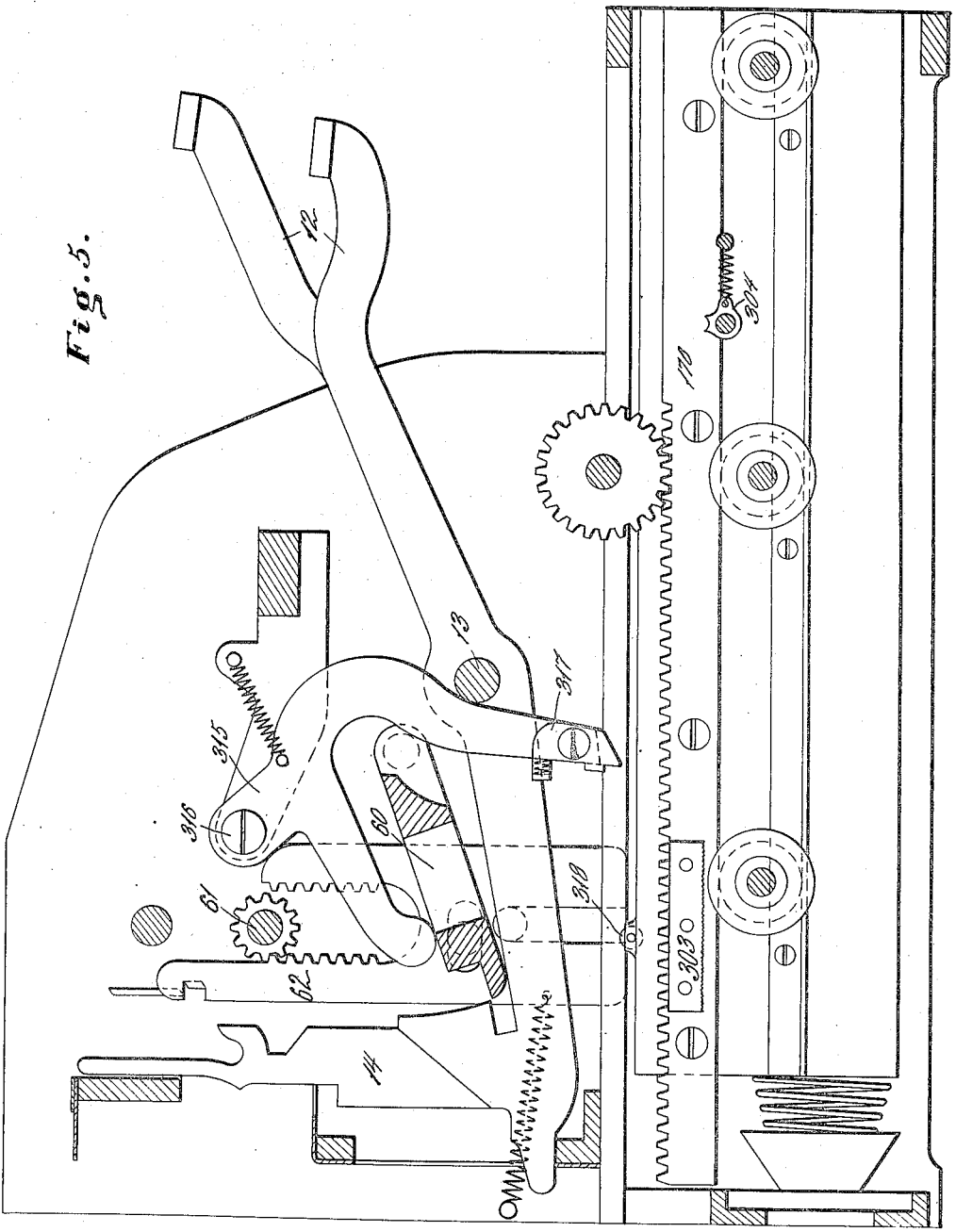
Figure 6:
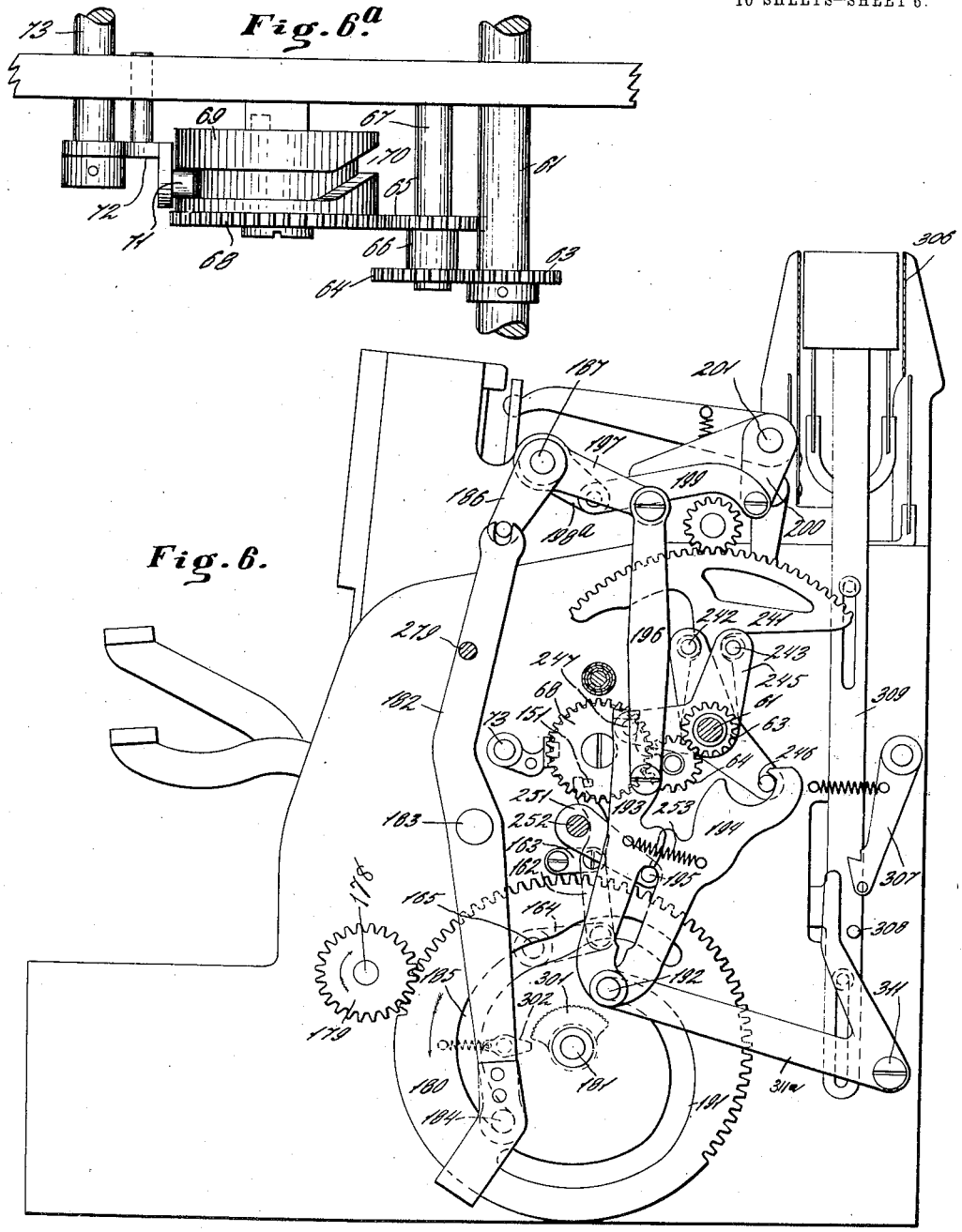
Figure 7:
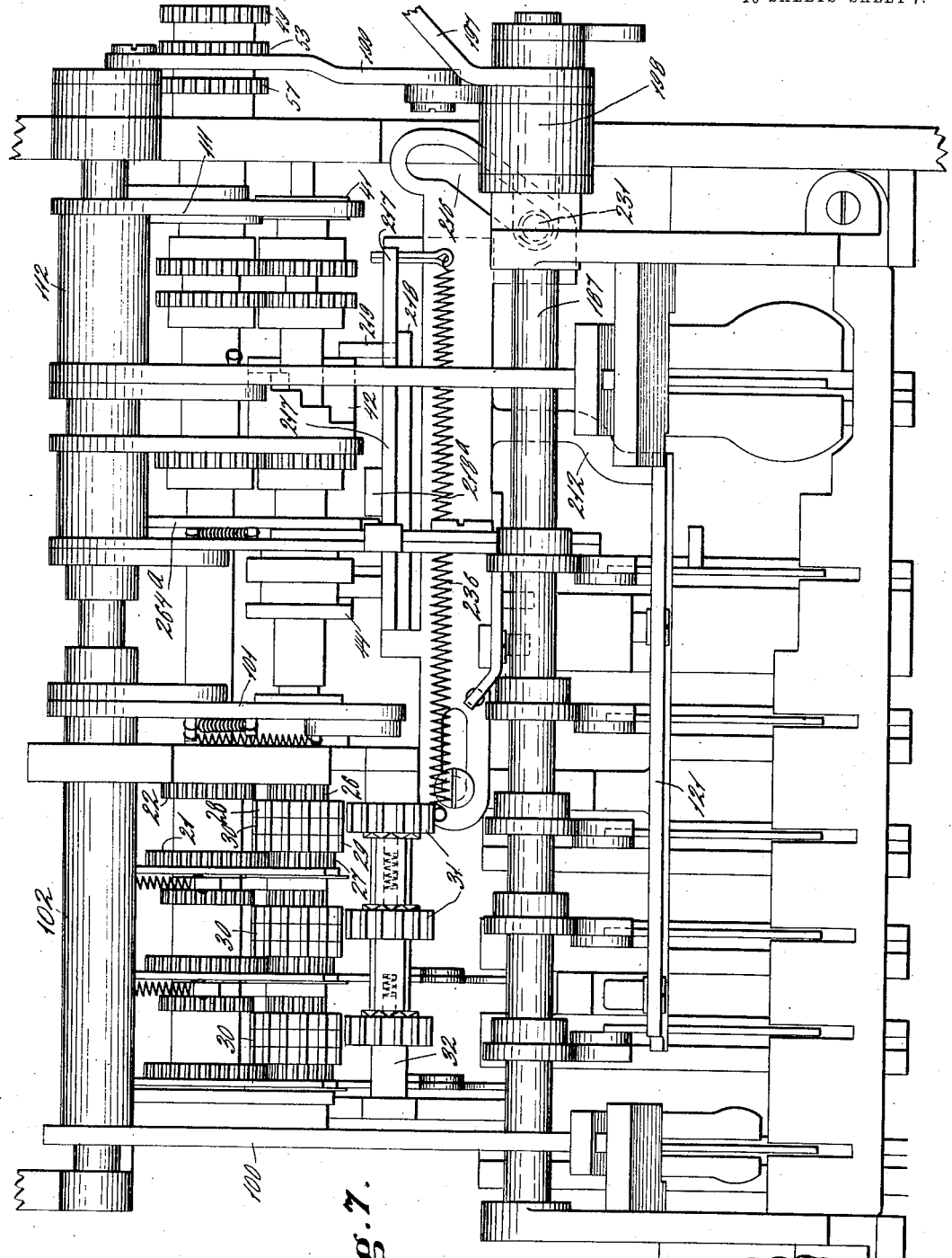

Of said drawings: Figure 1 is a plan view of the complete machine. Fig. 2 is a transverse vertical section through the machine showing the register connections. Fig. 3 is an elevation of the right hand end of the machine showing the printing mechanism. Fig. 4 is a transverse vertical section on line 4—4 of Fig. 1 showing some of the selector controlling connections and the drawer releasing device. Fig. 5 is a transverse vertical section through the machine on line 5—5 of Fig. 1, and looking in an opposite direction from that of Fig. 4. Fig. 6 is a section on line 6—6 of Fig. 1 looking in the direction of the arrow on said figure. Fig. 6ª is a detail of some of the parts shown in Fig. 6, the detail being in plan. Fig. 7 is a plan view of the selecting and ejecting mechanism, the coin receptacles having been removed. Fig. 8 is a vertical detail section of Fig. 1 showing the pennies controlling mechanism. Fig. 9 is a vertical detail showing the dollars ejecting mechanism. Fig. 9ª is a detail showing part of the mechanism for preventing ejection of change. Fig. 10 is a vertical detail showing the fifty cent ejecting mechanism and controlling devices. Fig. 11 is a detail showing the means for connecting the selecting devices with their operating mechanism. Fig. 12 is a detail showing a transfer device operative between the denominations of the selecting device. Fig. 13 is a detail showing the means for throwing out the counter and for shifting some of the selector connections. Fig. 14 is a detail of the ejector controlling mechanism. Fig. 15 is a detail of the five cent selecting device. Fig. 16 is a section of the selecting mechanism.

The mechanism in general comprises a series of receptacles for coins of different denominations and delivering mechanism for ejecting coins therefrom, together with selecting devices for controlling and determining the movement of the change delivering devices, and operating mechanism for the selectors. As shown in this case the selecting mechanism comprises rotary denominational elements which are arranged to be moved in opposite senses or directions differentially by the controlling keys, the final differential position of the selector determining the amount of change which will be ejected. A transfer mechanism operating to subtract from lower to higher denominations is provided, which performs the function ordinarily termed "borrowing" in subtraction. This type of selecting device entirely obviates the use of any alternate connections such as are in use in certain other types of change making mechanism, thereby eliminating the complexity and uncertainty incident to the use of that type of connections. In the present machine one set only of manipulative devices is employed, successive operations of which serve to adjust or position the selecting mechanism in opposite senses. This construction provides a distinct advantage over machines having two sets of manipulative devices, one for the deposit and one for the purchase mechanism, inasmuch as the construction is much less expensive and much less complicated when one set only of manipulative devices is employed. The deposit mechanism is first actuated, serving thereby to connect the selectors with the operating mechanism and to differentially adjust them, and when the same set of devices are operated again, the connection is automatically reversed so that the second operation reversely moves the selectors to an extent depending on the devices operated.

When the selecting mechanism has been adjusted to the proper amount of change, a main operating device, here shown as a cash drawer, is operated which serves to actuate the delivering mechanism to eject the predetermined amount of change and to restore all the parts to their normal positions. This feature of connecting the cash drawer for operating part of the mechanism is of advantage, inasmuch as the cash drawer will necessarily be required to be opened in order to place the deposited amount therein, as well as in some cases for the withdrawal of bills for change.

A printing mechanism under control of the manipulative devices is provided so that both the purchase and the deposit amounts will be printed on some record material at each operation of the machine, the record material being spaced between the printing of the purchase and deposit amounts, and spaced a greater distance after the printing of both amounts, so that on the record strip amounts will be printed in pairs close together with a space between pairs, thereby allowing an easy determination of all the parts of each sale. Certain other of the specific parts of the machine will be referred to in the specific description which follows.

The present invention is shown as applied to a well known type of machine now on the market, but it is to be understood at the outset that the change making mechanism may be applied to many different types of machine, the machine used being chosen as a well known example only. In this machine, a typical section of which is shown in Fig. 2, series of amount keys 12 are provided journaled on the supporting rod 13 and provided at their rear ends with standards 14 having differentially graded notches 15 adapted to engage a bar 16 of an operating or registering frame, and thereby serving to rotate segments 17 differentially. These segments are arranged to operate counter wheels $17^a$ to add the desired amount on the counter. This differential mechanism is arranged in the present case to adjust the change selecting mechanism.

Referring now to Fig. 4 it will be seen that some of the parts shown in Fig. 2 are also shown in this figure. The registering segments 17 are driven through cross connections from the devices, which also operate additional segments 18. The cross connections are somewhat different for the different banks of devices. The units registering segment 17 (see Figs. 1 and 2) is geared to a pinion 19 on a shaft 20, and also mounted rigidly on this shaft are pinions 21 and 22, pinion 22 as shown in Fig. 4 gearing with the pennies segment 18 which is directly actuated from the penny keys 12. In case of the dimes registering segment 17 this is operated by a sleeve mounted on the shaft 23 supporting all the segments, and the opposite end of the sleeve is connected through a yoke arm 24 with the corresponding operating segment 18. The dollars registering segment 17 is mounted rigidly on shaft 23 and the corresponding actuating segment 18 for the selectors is also rigidly mounted on the shaft. Clearly other types of connections may be employed between these pairs of segments, provided the connections fulfil the requirement that the segments must move together in both directions. It will be seen from Fig. 4 that the segments 18 which control the selectors gear with pinions 22 and 26.

As seen in Figs. 1 and 7 the pinions 22 are carried rigidly on sleeves which are (except the pennies sleeve) loose on the supporting shaft 20. On the other ends of these sleeves are larger pinions 21 which gear with pinions 27 on the same shaft as pinions 26, both the pinions 26 and 27 being loose on the shaft. It will be seen that this construction compels the pinions 26 and 27 to move correspondingly to the movements of segments 18 but in opposite directions. The pinions 22 and 26 move together, but clearly by the connection of pinion 22 to pinion 27 through the sleeve, the pinion 22 provides a reverse movement of pinion 26. Pinions 26 and 27 are each rigidly connected to additional pinions beside them, pinion 26 being connected to pinion 28, and pinion 27 to pinion 29, so that the pinions 28 and 29 also move in opposite directions. This mechanism is precisely repeated for the dimes denomination and the dollars denomination as shown in Fig. 7 and Fig. 16, so that no additional description of the higher denominations will be necessary. Mounted between each pair of pinions 28 and 29 is an additional pinion 30 controlling the change selecting mechanism directly. These pinions 30 are arranged to be connected to pinions 28 and 29 successively at successive operations of the keys 12 through a series of gears 31 mounted loosely on a supporting rod 32 which is arranged to be slid laterally and rocked around a center pivot to provide for changing the position of the pinions 31. so as to engage either pinion 29 or pinion 28 and also to rock the said pinions 31 into gear. It will be understood from the foregoing description that when the amount keys 12 are operated the pinions 31 are moved directly into gear with pinions 28 and 30 (refer to Fig. 7.) so that the operation of the keys will move the selector controlling pinion 30 in one direction. At the next operation of the keys for the purchase amount the shaft 32 is slid laterally and it is rocked so that the pinion 31 then connects pinions 29 and 30 thereby producing a reverse motion of pinions 30 corresponding to the purchase amount, whereby at the end of the second operation of the keys the selector pinions 30 are in an intermediate position depending on the amount of change to be delivered. The mechanism for sliding and rocking the shaft 32 will be referred to hereafter.

The connections from the several pinions 30 to the selectors themselves are shown in Figs. 7 and 16. Fig. 16 shows a section through the center of the shaft supporting all the pinions 28, 29 and 30 and shows the sleeved connections from said pinions to the selectors proper. The dollars set of pinions 28, 29 and 30 are mounted directly on the supporting shaft 36, the pinion 30 being tight on said shaft and the pinions 28 and 29 being loose on the said shaft. The dimes pinions are carried by the sleeve 37 surrounding said shaft. On said sleeve the dimes pinion 30 is tightly carried and the pinions 28 and 29 are loosely mounted. The pennies selecting pinions are all carried by a sleeve 38 surrounding the sleeve 37 and on this sleeve the pennies pinion 30 is tight, while the pinions 28 and 29 are loose. The dollars selector 41 is rigidly carried by the shaft 36 at the right as shown in Figs. 7 and 16 of the sleeves 37 and 38. This dollar selector is also shown separately in Fig. 9. The sleeve 37 driven by the dimes pinion 30 carries the dimes selector 42, this selector being a cylinder having cut away portions as shown in Figs. 1 and 9.

The pennies selector 43 is carried rigidly by sleeve 38 which also rigidly carries the pennies pinion 30 and this sleeve also carries a nickel selecting device 44, this device being shown separately in Fig. 15. The sleeve 38 controlling the pennies and nickel selector also drives a gear 46 meshing with a gear 47 on a sleeve 48 which is connected to a gear 49 at the other end of the sleeve as shown on Fig. 7 for restoring the parts to normal position, as will be hereafter described. The dimes sleeve 37 carries beside the dimes selector 42 the restoring pinion 50 meshing with a pinion 51 on a sleeve 52 surrounding the pennies restoring sleeve 48, this sleeve 52 carrying at its outer end a restoring pinion 53. The shaft 36 which is moved by the dollars selecting pinion 30 carries a restoring gear 54 meshing with a gear 55 mounted on a sleeve 56 at the outer end of which is a restoring pinion 57. These three restoring pinions 49, 53 and 57 are adapted to be returned by operating segments shown in Fig. 6 as actuated by the cash drawer so that the entire train of mechanism shown in Fig. 16 will be restored to normal position after each operation of the machine.

As before stated, when the keys are operated for the deposit amount the connecting pinions 31 are first thrown into gear with the pinions 28 and 30, thereby turning the selecting pinions 30 in one direction, and automatic connections are provided whereby a succeeding operation of the keys for the purchase amount shifts the connections so that the pinions 31 connect pinions 29 and 30 to produce opposite movements of said pinions 30. To accomplish this function the key coupler 60 of the machine (Fig. 5) is arranged to give a complete rotation to the main shaft 61 at each operation of the keys through the well known reciprocating rack mechanism 62. This rotating shaft 61 near its right hand end carries a gear 63 connected through gears 64 and 65, mounted on a sleeve 66 surrounding a stub shaft 67, to a gear 68 which is twice the size of gear 63. This mechanism is best shown in Figs. 6 and 6ᵃ. Gear 68 therefore makes a half rotation at each operation of the keys, so that a deposit and a purchase registration will together cause a complete rotation of the gear 68. Attached to this gear to rotate therewith is an integral cam 69 having a groove 70 in which rides an anti-friction roller 71 connected to an angle piece 72 mounted on a lateral rod 73. The shape of the cam groove 70 is such that when the keys are depressed, no movement of the shaft 73 is given, but when the keys are permitted to rise the oblique portion of the groove engages the roller and shifts it laterally to the left as seen in Figs. 1 and 13. For the second operation of the keys therefore the shaft has been shifted laterally to the left and a corresponding operation takes place, that is, during the second depression of the keys the rod 73 remains in its shifted position, but during the succeeding elevation of the keys the cam groove 70 returns it to its first position. It will be seen therefore that in both cases while the keys are being depressed the lateral rod 73 remains in either its normal or its adjusted position and that in both cases as the keys rise, the rod 73 is shifted. The rod 73 carries, as shown in Fig. 13, two collars 74 bearing headed pins 75 projecting through longitudinal slots 76 (Fig. 11) in frame bars 77 supporting the rod 32 which carries the connecting pinions 31, so that the selecting pinions are moved in both directions with the rod 73, although there is a slight lost motion in the connection, the movement of the rod 73 being greater than is requisite for the pinions 31; it may be here stated that the additional movement of the rod 73 is necessary for the purpose of throwing out or preventing operation of the totalizer. The shaft 61 as before stated makes a complete rotation at each operation of the keys and this feature is taken advantage of to control the rocking of the connecting pinions 31 into and out of mesh with the selecting pinions. As shown in Fig. 11 this shaft 61 carries a pair of cams 81 and 82 which respectively engage antifriction rollers 83 and 84 mounted on the frame arms 77. The mechanism is shown in Fig. 11 in its normal position and it will be clear that when shaft 61 rotates in the direction of the arrow the pinions 31 will be forced into engagement with the selector pinions, held there during the depression of the keys and then positively moved out of gear with the selecting pinions during the upward movement of the keys. This clearly provides for moving the selecting pinions in one direction only from the keys. It may be here noted that the cams 81 and 82 are wide enough or the antifriction rollers 83 and 84 are made wide enough to engage in both the normal and the shifted positions of the frame arms 77.

The selectors themselves may next be specifically described. Pennies selector 43 is shown in Fig. 8 and comprises a disk having two sets of oppositely placed surfaces. This disk is as before stated mounted rigidly on sleeve 38 and is rotated in either direction to a position determining the amount of change to be ejected. As a complete rotation of the selector 43 requires ten steps of movement it is clear that the graduations will be in two sets. The highest point of the penny selector 43 is normally under a controlling device as shown in this figure, the controlling device comprising arms 100 and 101 connected as shown in Fig. 7 by a sleeve 102. A by-pass or wiper pawl 103 is mounted on the arm 101 normally engaging a pin 104 and the pawl itself directly engages the selecting disk. The purpose of providing this pawl is that the selector 43 may be moved in either direction so that it is necessary to restore it to normal position some times in one direction and sometimes in another, and clearly if the part 103 instead of being a pawl was a rigid projection the high point of the disk 43 could not pass the same as will sometimes be required. The arm 100 supports a bent bar 106 which extends under the penny receptacle 107 and serves to raise and lower the coin stack therein. In this machine the ejectors are all arranged to be thrown backward and then forward at each operation of the machine and at the return forward movement of the ejectors if the penny stack has been lowered one or more of the coins therein will be ejected.

The dollar ejector 41 is shown in Fig. 9 and comprises a disk having one half thereof differentially cut away into steps, while the other half is a smooth circular curve. It will be understood, however, that the reason for this smooth curve is that the machine as shown is not adapted to change amounts higher than five dollars, so that only half the periphery of the disk 41 needs to be used. Coacting with the selector 41 is an arm 111 connected through a sleeve 112 (Fig. 7) to a second arm 113 supporting a bent arm 114 which extends under the coin stack 115 for the dollars. The operation of the dollars ejector is similar to the operation of the ejector for the pennies.

In the cases of both the pennies and the dollars ejectors, a rotating disk is made use of as the selector but the dimes selector is differently shaped, comprising a cylindrical device 42 having two sets of oppositely arranged steps. These steps are adapted to control the ejection of ten cent and twenty-five cent coins, the ejection of a fifty cent coin when necessary being produced by an annular cut away portion of the cylinder shown in Fig. 10 and numbered 121$^a$, this cut away portion also being shown in Fig. 16. The dimes selector also moves to any one of ten positions, in five of which a half dollar should be ejected and in five of which a half dollar should not be ejected. For this reason cut away portion 121 extends half way around the cylinder and for this reason diametrically opposite portions thereof are equally cut longitudinally, inasmuch as an equal amount of 5, 10 and 25 ct. coins should be ejected whether one end of a diameter is engaged by the change controlling device or the other end.

In the case of the pennies and the dollars ejector controlling mechanism, the arms 101 and 111 are arranged to move radially of the selecting disks 43 and 41, but in the case of the dimes mechanism the ejector controller moves laterally of the machine so as to bring a projection thereof into contact with any one of the steps on the selecting cylinder 42. In the case of the pennies and the dollars the machine is arranged to eject from one to four of each kind of coin at once, but with the other kinds only one coin is ejected so that no mechanism for raising or lowering the other coin stacks is necessary. The controlling device which determines whether or not a coin shall be ejected comprises a laterally moving slide 121 shown in Fig. 14 and provided with notches in different positions so arranged that when the slide is moved laterally until stopped by the selecting cylinder 42 those notches which are over the ejectors will permit the ejectors to rise so that a coin may be ejected. It is sometimes necessary to eject two ten cent coins and two receptacles and ejectors are therefore provided for the dimes.

In change machines having denominational selectors such as the present device some mechanism is desirable to perform the function known as "borrowing" in ordinary mental subtraction. This mechanism is in effect a subtracting transfer operating from lower to higher denominations and serving when the selector of lower denomination passes in a subtracting direction from the zero to the nine position to subtract one from the selector of next higher order. This mechanism is shown in Fig. 12. The shaft 61 which is given a complete rotation at each operation of the machine carries two successively arranged cams 126 and 127 giving successively operated transfers. The shaft 36 and the sleeves 37 and 38 surrounding the same as shown in Fig. 16 are extended somewhat to the left of the selecting pinions 30 mounted respectively thereon and are each provided with ratchet wheels 128 and disks 129 having usual transfer tripping cams 130 provided on such disks. Trip pawls 131 are carried by a rod 132 and are arranged to normally engage transfer pawls 133 in the manner usual in registering devices. Clearly when the cam disks 129 move past the zero positions the cams 130 carried thereby will engage the trip pawls 131 and move them to release the transfer pawls 133. During the latter part of the operation the cams 126 and 127 successively engage anti-friction rollers 134 carried by arms 135 which support the pawls 133 and move the transfer ratchet 128 of next higher order one step in the subtracting direction. This mechanism will be easily understood inasmuch as it is old and well known in the art, the only difference being that it is arranged to subtract and not to add. A study of Fig. 16 will show that each of the denominations is provided with these transfer ratchets, although of course no ratchet is necessary for transferring purposes on the lowest denomination nor is a transfer cam necessary on the highest denomination.

The foregoing description of the selecting mechanism and the controlling devices therefor may be briefly recapitulated as follows: The keys are first depressed for the deposit amount, this depression serving through the elevation of the key coupler 60 to give a half rotation of the shaft 61 which through the cams 81 and 82 (Fig. 11) immediately engages the connecting pinions 31 with the selecting pinions 30 and the driving pinions 28. As the keys are depressed a differential movement of the selecting pinions 30 is therefore given. When a key reaches its lowest position and starts to return, the cam 69 having the cam groove 70 shifts the rod 73 laterally, although not until after the actuating pinions 31 have been rocked out of mesh with the selecting pinions 30 and the driving pinions 28. During the downward movement of the keys therefore the selecting pinions 30 are driven in one direction and through their connections with the pennies selector 43, the dimes denomination selector 42, and the dollars selector 41, these selectors are moved differentially. As the keys return to normal position the transfer devices (Fig. 12) are idly operated, but no transfer is ever necessary during this part of the operation, inasmuch as the trip pins stand normally at a zero position and can only be moved nine steps forward at this part of the operation. When the keys are depressed in correspondence with the purchase amount the shaft 61 is given a half rotation again and the connecting pinions 31 are thrown into mesh to connect the selecting pinions 30 with the reversely driving pinions 29, so that the selecting mechanisms are moved reversely according to the amount of purchase. As the keys are elevated from the second operation, the transfer mechanism is again actuated and this time may or may not serve to reversely move the denominational elements in accordance with whether a subtraction is or is not requisite.

In the present invention the operating device for ejecting change and for restoring the change selecting mechanism comprises a cash receptacle shown as a usual cash drawer. This drawer is arranged to be locked in its inward position and to be released only at the end of the second operation of the keys. As the drawer moves outwardly the ejecting mechanism is moved to an operative position and the determining devices under control of the selectors are permitted to move to their determined positions. As the drawer is pushed back to its inward position the ejectors are forced under the coin stacks and eject the proper amount of change, this inward or rearward movement of the drawer also serving to restore to normal or zero position all of the selecting mechanism and connections.

The large gear 68 shown in Fig. 6 is arranged to make a half rotation at each operation of the keys and for this reason this gear is used to control the drawer release. A square pin 151 is carried on this gear and normally rests against a bar 162 carried by a link 163 and a crank arm 164, thereby giving the arm 162 a nearly parallel motion. The crank arm 164 is mounted on a pivot shaft 165 which also as shown in Fig. 4 carries near the center of the machine another arm 166 projecting over an anti-friction roller 167 mounted on a bell crank lever 168. This bell crank 168 is provided at its forward end with a lateral flange 169 which when the bell crank is depressed engages under a latch 170 beside which is pivoted arm 171 having a pin 172 projecting over the rearward extension of the latch 170. The rear arm of the bell crank 168 engages a wheel 173, the notches of which are in the path of an angle piece 174 fastened on the cash drawer. It will be clear that in the position of the parts shown in Fig. 4, the cash drawer is locked against forward movement. When the keys are operated for a deposit amount, the projecting pin 151 on the gear 68 is carried away from the arm 162 and thereafter when the purchase amount keys are operated, the pin 151 completes its rotation to the position of Fig. 6, during the very last part of this movement engaging the top end of the arm 162 and depressing the same until the pin 151 passes free of the said arm. This lowering of the arm 162 rocks the shaft 165 and so depresses the arm 166 carrying down with it the bell crank 168 and releasing the cash drawer. As the bell crank moves downward the flange 169 thereof engages under and is latched by the pawl 170 being held in drawer releasing position until the angle flange 174 strikes the lower end of the arm 171, thereby rocking the pawl 170 backward and releasing the bell crank 168. The drawer then moves on outwardly to its extreme forward position from which it is manually returned.

The drawer is provided with a horizontal rack 176 shown in Figs. 4 and 5 which rack engages a gear 177 on a short shaft 178. On the other end of the shaft as shown in Figs. 1 and 6 is a gear 179 meshing with a large mutilated gear 180 mounted on a pin 181 on the main frame. It is from this large gear that the drawer controlled part of the operation is effected.

It was before stated that as the drawer moved outwardly the ejectors were withdrawn to an operative position and the ejector determining devices permitted to move to a position depending on the setting of the selecting devices. To accomplish the first of these two functions a lever 182 pivoted on a pin 183 of the main frame is provided at its lower end with an anti-friction roller 184 engaging in a cam groove 185 of the large gear 180. The cam groove 185 is nearly circular through about half of its extent and then increases its radial distance from the center through the remaining part of the groove. The result of this is that as the gear is rotated in the direction of the arrow, no movement of the lever 182 takes place until the drawer is about half way out, but during the farther opening of the drawer the lever is rocked around its center pivot to throw its upper end rearward. The upper end of lever 182 has a pin and slot connection to a crank arm 186 rigidly mounted on a shaft 187, which shaft as shown in Figs. 4, 8 and 9 carries rigidly depending crank arms 188 having pin and slot connections and to the ejectors 189. It will be clear from this description that the ejectors are drawn rearwardly, that is to the right as seen in the figures referred to, during the latter half of the opening movement of the cash drawer and during the first half of the return movement thereof are drawn forward again to their original position thereby ejecting some of the coins.

To permit the determining devices to control the ejection of coins under determination of the selectors a second cam groove 191 is provided in the mutilated gear 180. This cam groove has riding therein a roller 192 which serves to move upwardly and downwardly two arms 193 and 194, these arms having cut away portions in which moves a pin 195, to guide the arms. As the cash drawer opens the shape of the cam groove is such that the roller 192 is raised, thereby carrying up the arm 193. This arm 193 is connected through a link 196 to a crank arm 197 mounted on a sleeve 198 on the shaft 187 to which collar is also rigidly connected a second crank arm 198ª serving to move the link 199 and through this link to rock a second crank arm 200 rigidly mounted on shaft 201, which shaft also loosely supports the ejector controllers for the pennies, dollars and half dollar coins as shown in Figs. 8, 9 and 10. This shaft 201 is therefore rocked as the cash drawer opens, thereby rocking a series of arms 202 also rigidly carried thereon to carry pins 203 projecting laterally from said arms away from the lever arms which engage the various selectors. It will be seen that as the shaft 201 rocks, the pins 203 will be carried away from the determining levers which will then drop until one of the arms thereof engage the selecting devices, thereby in the case of the pennies and the dollars lowering the coin stacks more or less according to the position of the pennies and dollars selectors and in the case of the half dollar devices shown in Fig. 10 to permit an ejection of one half dollar if required. It will be understood, however, that the mechanism is shown in normal position in Figs. 8, 9 and 10 so that if the selectors have not been moved, no pennies or dollars will be ejected, even though the pins 203 are moved from under the determining devices.

The operation of the determining devices for the five cent, ten cent and twenty five cent ejectors may next be described.

It will be remembered that it was stated that the five cent ejector was in effect made a part of the dimes denomination and this is accomplished by providing for a movement in steps of a dimes determining device under control of the dimes selector to determine the number of dimes ejected, the movement being in direct proportion to the amount of change required. To provide for the ejection of nickels this laterally moving determining device has an additional controlling mechanism under the control of the nickels selector which will permit and provide for an additional half step movement laterally of the dimes determining device, thereby permitting the ejection of an extra nickel whenever necessary. This determining device comprises the slide 121 shown in Fig. 14 which will be seen to be provided with a series of notches in the under side thereof, these notches being arranged to coöperate with the ejectors 210 for the nickel, dime and twenty five cent coins. The slide 121 is carried by headed pins 211 mounted on the frame and at the right hand end of the slide is a bent driving arm 212 connected to a second slide 213 also carried through slots through which pass headed pins 214. Directly over the slide 213 is a second slide 215 having a cam groove 216 in the right hand end thereof as also shown in Fig. 7, this slide also being carried by the pins 214 and serving to drive slide 213 and the slide 121 through a vertical extension 217 of the slide 213, which vertical extension supports a plate 218, the plate 218 having a square pin 219 projecting therefrom which passes through a slot in the plate 217 and engages as shown in Fig. 7 with cylindrical dimes selecting device 42. The vertical extension 217 and the plate 218 are each provided with pins supporting anti-friction rollers 220 and 221, these rollers being also shown in Fig. 15, it being noted that roller 220 is fast to slide 217 while roller 221 is fast to the plate 218 and passes through a slot in the slide 217. These rollers 220 and 221 engage in two cam grooves 222 and 223 in the nickel selector. These cam grooves are parallel for half of the distance around the selector, then approach each other as shown in Fig. 15 then remaining parallel for the other half distance around the cylinder and then passing farther apart. The device is shown in normal position in Fig. 15 and if a deposit movement of from one to four cents is made, the rollers will simply permit the selector to move around without displacing them. If an amount from five to nine cents is registered as a deposit, the separating portions of the grooves will pass the rollers, thereby forcing the rollers apart, or rather moving one of the rollers. It will be remembered that roller 220 is carried by the slide 217 but as slide 217 is rigidly held until positively moved, the rotation of the nickel selector will, if the separating portions of the movement reach the rollers cause a movement to the right of roller 221, as long as the roller 220 is held stationary. This movement also necessitates a movement to the right of the nickel selector 44, and this is provided for by splining the said selector or a sleeve surrounding and rigid with the sleeve 38 (see Fig. 16). The lateral movement of the slide 215 and the consequent movement of the determining slide 121 are provided for by a crank arm depending from collar 198$^a$ which is rocked by the opening movement of the cash drawer. A roller shown in dotted lines in Fig. 7 and numbered 231 is fastened at the lower end of the crank arm and rides in the cam groove 216 of the plate 215. When the drawer is opened, the rollers 231 will be moved through the cam slot 216, thereby forcing the slide 215 to the left and carrying the determining slide 121 with it. It will be seen from Fig. 7 that the square projection 219 from plate 218 is adapted to engage and be stopped by the steps of the cylindrical dimes selector 42.

The change ejecting and determining operation may be recapitulated as follows: The two operations of the keys serve to position all the selectors differentially, the pennies and dollars selectors passing under the depending arms as shown in Figs. 8 and 9, the dimes cylindrical selector being rotated more or less and the nickel selector 44 being also rotated more or less. In the case of the nickel selector, if from one to four cents is finally to be ejected, the rollers 220 and 221 retain the position of Fig. 15 and no movement of the parts controlled thereby is given. If, however, the final position of the nickel selector is such that from five to nine cents should be ejected, the cam grooves 222 and 223 will have forced the roller 221 to the right as roller 220 is rigidly held, thereby slightly sliding the selector 44 on its sleeve. Assuming a five cent coin to be needed as change, the plate 218 will therefore then move what may be termed a half step to the right, thereby carrying square pin 219 a half step away from the dimes selector. When the cash drawer is opened the determining devices for the pennies and dollars coin stacks are allowed to be positioned as determined by the pennies and dollars selectors, and the plate 215 is moved positively to the left by the rocking of the sleeve 198ª and the crank arm depending therefrom. As shown in Fig. 14 the vertical extension 217 of plate 213 is connected to the slide 215 by a spring 236 which clearly will be tensioned as the slide 215 moves to the left. The tensioning of the spring 236 will cause the plates 217 and 213 together with the plate 218 to move to the left until the square pin 219 engages a step of the dimes selector 42 which is in its path, this movement carrying the determining slide 121 with it and also moving the nickel selector 44 along its sleeve. The notches in the under side of slide 121 are so positioned that the ejectors 210 for the proper amount of changed coins will be directly under notches through which the ejectors can slightly rise, so that when the ejectors are finally moved forward by the closing of the drawer the proper coins will be ejected. In case no nickel was desired the rollers 220 and 221 would not have been separated and the square pin 219 would have one half step less movement until it struck the dimes selector, thereby giving one half step less movement to the determining slide 121 and bringing another combination of notches over the ejectors 210. It will be seen that by moving the plate 218 and the square pin 219 a half step to the right before the mechanism as a whole is moved to the left, that a half step greater movement of the determining slide 121 will be given than if the plate 218 had not been so moved. It will be understood that the closing of the cash drawer operates the ejectors before the crank are depending from the sleeve 198ª is returned to restore the determining slide 121 and the determining arms for the pennies and dollars ejectors.

The selecting mechanism is returned to normal position during the latter part of the closing movement of the cash drawer and to perform this function advantage is taken of the arms 193 and 194. It will be remembered that the selecting devices are connected (see Fig. 16) to pinions 46, 50 and 54, these being connected through pinions 47, 51 and 55 to the restoring pinions 57, 53 and 49. These pinions 57, 53 and 49 are connected separately to restoring segments 241 journaled on shaft 61 and on each side of the supporting bars of the segments are rollers 242 and 243, these rollers being supported by bell cranks 244 and 245. The bell cranks 244 and 245 are journaled on shaft 61, the bell crank 244 being provided at its lower end with a pin 246 normally engaging a cut away portion of the arm 194 and the bell crank 245 being provided with a similar pin 247 normally engaging a cut away portion of the arm 193. The pin 195 which was previously stated as being adapted to guide the arms 193 and 194 is also used to separate the said arms for the purpose of disconnecting them from the bell cranks 244 and 245. To accomplish this function the pin 195 is mounted on a crank arm 251 journaled on the trunnion 252 of the key coupler. The mechanism as shown in Fig. 6 is in the normal position and it will be clear that in order to move the selecting devices in either direction the bell cranks 244 and 245 must be released, inasmuch as the segments 241 are connected positively to the selecting devices.

The key coupler is elevated with any key so that the pin 195 immediately moves upward, thereby forcing apart the arms 193 and 194 and carrying their upward projecting ends from over the pins 246 and 247 on the bell cranks 244 and 245, so that the segments 241 may move without hindrance in either direction. Supposing one or both of the bell cranks to have been moved by opposite movements of the three segments 241, the pins 246 and 247 will have been carried above the upper ends of the arms 193 and 194, but when the cash drawer is opened the said arms will be raised by the cam groove 191 until the arms, which are shown as connected by the spring 253, snap over the pins 246 and 247. During the return movement of the drawer, the arms 193 and 194 will clearly be brought downward again and will rock the bell cranks 244 and 245 back to the position of Fig. 6, thereby in all cases returning all of the restoring segments 241 to their central zero position. This movement will clearly serve to restore the selectors and the selecting pinions 30 to their normal central position also.

It may happen through mistake or intention that the purchase amount registered on the keys would sometimes exceed the deposit amount. In such a case it is of course necessary that no change should be ejected, although the selectors would have been positioned to permit ejection of more or less change. Such an operation might occur through intention where the amount tendered in payment of a sale was precisely equal to the amount of the purchase or it might occur when the cash drawer was desired to be opened to change a coin or bill. To prevent the effective operation of any of the ejectors if the purchase amount is greater than the deposit amount, means are provided for preventing the movement of the determining devices from their normal zero position so that although the ejectors will be moved rearward and then restored to normal position there will nevertheless be no ejection of change. It will be clear by a moment's consideration of the problem that the performance of this function may be placed under the exclusive control of the dollars selecting mechanism. This follows from the provision of the transfer mechanism between the several denominations of the selecting mechanism inasmuch as, if an amount in either the cents or the dimes denomination greater than the deposit amount is registered the purchase selector corresponding thereto will be moved from its normal central position in a subtracting direction. This movement will clearly cause a transfer movement to the dollars selecting mechanism thereby moving it also in a subtracting direction. A mechanism is therefore provided which is moved to operative position when the dollars selecting device is moved from its central zero position in a subtracting direction, and this mechanism is employed to prevent any movement of the determining devices for all denominations of the machine.

Fig. 9ª shows a detail of the preventing device and as shown it comprises a cam 261 fast to dollar selector 41 over which engages a lever arm 262 fast on a transverse shaft 263. In this figure cam 261 is shown in central or zero position and it will be clear from the preceeding description that the deposit movement will be in a clock wise direction whereas a purchase movement will be in a counter clock wise direction. As this machine is not adapted to receive the entry of more than five dollars the cam is circular for half of its circumference while the remaining half is of a different radius. It will be understood that any subtracting or counter clockwise movement of cam 261 will serve to elevate lever 262 thereby rocking shaft 263. This shaft is also shown in Fig. 9 and is provided with a series of crank arms 264 having laterally extending pins 265 which are adapted to engage under the levers of the determining devices which themselves engage the selecting disks. Clearly when cam 261 is rotated in the subtracting direction the raising of lever 262 will raise the lever arms 264 thereby carrying the pins 265 under the arms of the determining devices and preventing them from dropping even if the selector's disks have moved so that they normally would drop. A similar device is provided in connection with the fifty cent ejector as shown in Fig. 10. As seen on Fig. 7 the dimes determining slide 217 is provided with a lateral lug 218ª adapted to coöperate with the lever arm 264ª also rigidly carried on shaft 263. Normally the lever arm 264ª is out of the path of lug 218ª but when the cam 261 is rotated in the subtracting direction the lever arm 264ª is raised into the path of the lug 218ª thereby entirely preventing any lateral movement of the dimes determining slide 121.

It will be evident from the position of the devices in Fig. 14 that normally none of the ejectors will be allowed to rise through the notches in slide 121 and therefore no coin will be ejected unless the determining slide moves more or less to the left of the figure. When, however, the cam 261 has operated in a subtracting direction, any movement of the determining slide 121 is prevented and therefore no coins will be ejected. For the fifty cent ejector a device very similar to that used in connection with the pennies and dollars device is provided.

The preventing mechanism previously described is operative in all cases except when a purchase amount having an excess of five dollars over the corresponding deposit amount is entered in the machine. That is, suppose for example a purchase of five dollars was made and the exact amount tendered in payment. In such an operation the no sale key might be first depressed to carry the machine through the first half of its operation and the five dollar purchase key next depressed to enter the amount of purchase on the register and printing devices and to indicate the same. In this machine the cam 261 will be given a complete rotation by ten steps of movement, so that these five steps would necessarily carry it around a half rotation. A deposit of five dollars would also move the cam 261 five steps in an adding direction, and therefore would bring it to the same position as would be the case if it were moved five steps in a subtracting direction; but, in one case the change ejectors should be effective and in the other case they should be ineffective. To take care of this anomalous case an additional device is provided consisting of a pin 321 on the restoring segment 241 for the dollars selector. This device is shown in Fig. 9. The shaft 263 which carries the preventing lever arms 264 is provided with a depending lever arm 322 which if the dollars selector is moved five steps in the subtracting direction, thereby carrying the dollars restoring segment 241 also five steps in the subtracting direction, will bring the pin 321 into contact with the lever arm 322 rocking the same and thereby raising the arms 264 so as to prevent the dropping of the determining devices and also to prevent any lateral movement of the dimes determining slide 121.

It is desirable to provide a printed record showing the transactions entered in the machine, and this mechanism is at the right hand end of the machine and differs from that in use on the machine as on the market only in some few particulars. Referring to Fig. 4 it will be seen that the selector controlling segments 18 mesh with gears 271, these gears being carried on nested sleeves running through to the right hand end of the machine and being there provided with printing wheels 272. The shaft 61 also extends to this part of the machine and is provided with a cam 273 for operating the platen 274. The key coupler trunnion 252 carries on its outer end an arm 275 carrying a pawl 276 for feeding the record strip through a ratchet 277 carried by the winding roll 278. This mechanism provides for printing both the deposit and purchase amounts and for feeding the paper after each operation of the keys, but it is desired also to space the record between the pairs of amounts so that the strip will indicate all the elements of each transaction. To provide this extra spacing the lever arm 182 shown on Fig. 6 has fastened thereto a lateral pin 279 shown also in Fig. 1 and this pin has mounted on the outer end thereof an additional pawl 280 engaging a ratchet 281 on a gear wheel 282 which through an intermediate gear 283 is connected to a gear 284 rigid with the feeding roller 278. As the drawer is moved outwardly and then returned the lever arm 182 is rocked and the pawl 280 is carried first rearward and then forward, during the forward movement also moving the winding roller 278 and thereby providing an extra feed of the strip besides that given and due to the operation of the keys. Any means of inking the type wheels may be used, that shown consisting of a usual inking ribbon. As shown in Fig. 1 the machine is provided with a registering device or totalizer comprising a series of wheels adapted to engage and be operated by the registering segments 17, and wheels of higher denominations operated through transfer mechanism from the wheels of lower order. It is desired usually to add on the register the amounts of purchase only and with this end in view means are provided for preventing the engagement of the counter with the actuating racks 17 at each deposit operation of the keys. This mechanism is very similar to that shown in the patent to Cleal No. 718,565. In the patent referred to a push key is provided which serves to slide laterally a rod controlling a notched plunger and carrying the notch thereof into or out of position to engage a lever which serves to throw the counter into connection with the actuating gear. In the present machine the cam 69 of Figs. 6ª and 13 takes the place of the push key, serving as it does to move the rod 73 laterally at each operation of the machine. The camming lever is shown in Fig. 2 as engaging the plunger referred to.

To compel a complete movement of the cash drawer in both directions, full stroke devices are provided one of which comprises a rack 301 and a pivoted pawl 302 engaging the same as shown in Fig. 6. This well known construction will clearly compel a full movement of the mutilated gear 180 and therefore a full movement of the cash drawer. As an additional precaution a second full stroke rack 303 shown in Fig. 5 is attached directly to the cash drawer and is adapted to engage during the extreme outer part of the movement of the cash drawer with a stationary pawl 304. This rack 303 is provided with very fine teeth so that the lost motion incidental to this type of full stroke device may be reduced to as small an extent as possible. By the provision of this rack 303 positioned as it is to engage and be operated during the extreme outward movement of the drawer, a complete movement of the drawer is provided.

It is desirable not to expose to view the indicators elevated in connection with an entry of a deposit amount but on the other hand it is desired to permit the exposure of these indicators for the purchase amounts. To accomplish this function the shutter or flash 306 usual in this type of machine, in which it is arranged to be raised with the key coupler thereby hiding the indication until the end of the operation, is provided and holding means comprising a pawl 307 (Fig. 6) is shown. When the machine is operated for a deposit amount, the flash 306 is raised with the indicators for the amount but is adapted to be latched in raised position by the pawl 307 engaging a pin 308 carried on the flash elevating arm 309. Clearly this pawl will retain the flash in elevated or concealing position even though the key coupler returns to its normal position. When the purchase amount is entered the indicators corresponding thereto are raised and are latched in their raised position by the usual back rod 310 shown in Fig. 2, but the flash still remains in concealing position. When the cash drawer is moved forwardly the pin 192 carried by a lever 311ª (see Fig. 6) pivoted on a pin 311 rocks around said pin finally carrying the pawl 307 away from the pin 308 and thereby permitting the flash to descend and expose the purchase indicator. It will be understood that the back rod 310 is rocked at each operation of the keys so that the indicators for the deposit amount will be released when the purchase amount is entered and the purchase indicators raised.

It is practically impossible to delay the releasing of the drawer until the very last increment of movement of the amount keys, but it is nevertheless desirable that the keys should be completely in home position before the ejecting mechanism operates. To secure this result, mechanism shown in Fig. 5 is provided whereby the first part of the opening movement of the cash drawer positively restores the key coupler to normal position and consequently also returns any operative keys to their normal position. This mechanism comprises a curved arm 315 carried on a pin 316 mounted in the main frame and provided with a depending pawl 317 pivoted thereto and arranged to be moved by the elevation of the key coupler into the path of the roller 318 carried by the cash drawer. Clearly if the keys have not been completely returned to normal position the opening movement of the cash drawer will cause the roller 310 to engage the pawl 317 and rock the lever 315 to the position of Fig. 5, thereby positively restoring the coupler 60 and the keys. During the inward movement of the cash drawer the roller 318 wipes idly by the pawl 317.

While the mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows.

1. In a machine of the class described, the combination with change delivering devices and selecting mechanism for controlling said delivering devices, of keys for actuating said selecting mechanism in opposite senses by two successive operations of any of said keys.

2. In a machine of the class described, the combination with change delivering devices, and selecting mechanism for determining the amount of change to be delivered by said devices, of manipulating devices, and means controlled thereby for adjusting said mechanism in opposite senses by two successive actuations of any of said manipulative devices.

3. In a machine of the class described, the combination with change delivering devices and differentially movable selectors for determining the amount of change to be delivered by said devices, of manipulative devices, and means operated thereby for adjusting said selectors in opposite senses by two successive adjustments of any of said manipulative devices.

4. In a machine of the class described, the combination with change delivering devices, and rotary selectors for determining the amount of change delivered by said devices, of a series of keys, and means controlled thereby for giving said selectors differential adjustments in opposite senses by two successive actuations of any of said keys.

5. In a machine of the class described, the combination with change delivering devices, and means for operating them, of denominational selecting devices for controlling said delivering devices having separate motion, and keys for adjusting said selecting devices in opposite senses by two successive actuations of any of said keys.

6. In a machine of the class described, the combination with change delivering devices, and mechanism for operating them, of rotary selecting devices controlling said delivering devices having separate motion, and a set of means for adjusting said selecting devices in opposite directions by two successive actuations of any of said means.

7. In a machine of the class described, the combination with change delivering devices, and mechanism to operate them to deliver change, of separately movable rotary selecting devices for controlling said delivering devices, and keys for adjusting said selecting devices in opposite directions by two successive actuations of any of said keys.

8. In a machine of the class described, the combination with a series of keys, of change delivering mechanism, and means for automatically calculating the amount of change to be delivered by successive actuations of any of said keys.

9. In a machine of the class described, the combination with a selecting device, of keys, and means automatically actuated by two successive operations of any of said keys for adjusting said selecting device in opposite senses.

10. In a machine of the class described, the combination with a selecting device, of a series of keys, and connecting means between said keys and selecting devices, automatically changed so that successive operations of said keys will produce reverse motion of said selecting devices.

11. In a machine of the class described, the combination with a selecting device, of a series of keys, and connecting means between said keys and selecting device shifted by said keys at successive operations thereof so that operation of said selecting device in reverse directions is provided.

12. In a machine of the class described, the combination with a rotary selecting device, of a series of keys, and connecting means between said keys and selecting device shifted by successive operations of said keys, to cause operation in reverse directions of said selecting device.

13. In a machine of the class described, the combination with a rotary selecting device, of a series of keys, gears for connecting said selective device to said keys, and means for sliding said gears in reverse directions after each operation of said keys.

14. In a machine of the class described, the combination with selecting devices and change delivering devices controlled thereby, of keys for operating said selecting devices, a cash safe having a movable part, and means actuated thereby for operating said delivering devices, and returning said selecting devices to normal position.

15. In a machine of the class described, the combination with selecting devices, and change delivering devices having their movement controlled by said selecting devices, of manipulative devices for positioning said selecting devices, a cash safe having a movable part, and means actuated thereby for operating said delivering devices to eject change and for returning said selecting devices to normal position.

16. In a machine of the class described, the combination with change selecting devices and means for adjusting them to select any desired amount of change, of change delivering devices controlled by said selecting devices, and oppositely acting means for resetting the selecting devices in either direction to normal central position.

17. In a machine of the class described, the combination with a series of denominational change selecting devices, and means for moving them separately in opposite directions from a normal central position, of change delivering devices controlled by said selecting devices, and means operated by the selecting device of highest denomination when moved in one of said directions for preventing delivery of change.

18. In a machine of the class described, the combination with change delivering devices, of a change selecting device, and means for adjusting same differentially, an element movable over spaces in accordance with the adjustment of said selecting device, means for giving said element a half space movement, and an additional change selecting device for controlling said means.

19. In a machine of the class described, the combination with a dimes selecting device, and means for placing it in any one of ten positions, of change delivery devices, an element movable over spaces in accordance with the adjusted position of said dimes selecting device, an additional selecting device, and means controlled thereby for moving said element a half space, said element determining the action of said delivery devices.

20. In a machine of the class described, the combination with denominational change selecting devices, of change delivering devices, a determining device, means for moving it in steps under control of a selecting device of higher denomination, and means under control of a selecting device of lower denomination for moving said determining device a half space of additional movement, said controlling devices controlling said delivering devices.

21. In a machine of the class described, the combination with change delivering devices, of a change determining device controlling the delivery of change, denominational change selecting devices, means for differentially adjusting each of said selecting devices, and means for controlling said change determining device from two of said selecting devices.

22. In a machine of the class described, the combination with change delivering devices, of means for operating said delivering devices, mechanism normally locking said operating means, and manipulative devices for determining the amount of change delivered and releasing the locking devices for the operating means only after two operations of said manipulative devices.

23. In a machine of the class described, the combination with change selecting devices and keys operating said selecting devices, of change delivering devices controlled by said selecting devices, a cash safe having connections to actuate said delivering devices, means normally locking said safe, and connections from said keys for releasing said cash safe locking means.

24. In a machine of the class described, the combination with change delivering devices, of means for operating same, devices normally locking said operating means, manipulative devices and connections for determining the amount of change and releasing said operating means, the connections being so constructed as to require two operations of said manipulative devices for releasing said operating means.

25. In a machine of the class described, the combination with change delivering devices, and keys for controlling the amount of change delivered, of a cash safe for operating said delivering devices, and means operated by said cash safe for positively returning said keys to normal position.

26. In a machine of the class described, the combination with change delivering devices and keys controlling the amount of change delivered, of a member common to said keys and serving to return them to normal position, and a cash safe for operating said delivering devices and also operating said common member to positively reset said keys.

27. In a machine of the class described, the combination with a coin holder, a coin support, and an ejector for said holder, of an operating mechanism, and means actuated thereby for giving said ejector an excursion at each operation, means for holding said support elevated, and means operating said holding means to permit said support to drop to an extent dependent on the amount of coin desired.

28. In a machine of the class described, the combination with a coin holder, of an ejector, and means for actuating it, a change selecting device, a coin support, and means for adjusting same to bring a desired number of coins in the path of said ejector, said adjusting means acting under control of the selecting device.

29. In a machine of the class described, the combination with a support for a coin stack, of an ejector and means for moving it through a fixed path, change selecting devices and means controlled by said selecting devices for adjusting said support differentially, to bring a desired number of coins in the path of the ejector.

30. In a machine of the class described, the combination with denominational change selecting devices having normally a central position, of means for moving said devices separately in opposite directions, change delivery devices controlled by said selecting devices, and a cam controlled by the selecting device of highest denomination for preventing delivery of change by the delivery devices.

31. In a machine of the class described, the combination with a change selecting device and means for moving same differentially, of change delivery devices controlled by said selecting device, and means adjusted by said selecting device for preventing operation of said delivery devices when said selecting device assumes certain positions.

32. In a machine of the class described, the combination with a rotary change selecting device, and means for adjusting it differentially, of change delivery devices controlled by said selecting device, and means movable with said selecting device for preventing effective actuation of said delivery devices, when said selecting device has been moved to certain positions.

33. In a machine of the class described, the combination with a rotary change selecting device, and means for adjusting it differentially in opposite directions, of change delivery devices controlled by said selecting device, a cam movable with said selecting device, and a lever controlled by said cam for preventing effective actuation of said delivery devices in certain positions of said cam.

34. In a machine of the class described, the combination with a change determining device, and ejecting mechanism controlled thereby, of change selecting devices, means controlled by one of said selecting devices for moving said determining device over a desired number of spaces, and means controlled by another selecting device for giving said determining device an additional half space movement.

35. In a machine of the class described, the combination with ejecting mechanism, and a change determining slide for controlling the effective operation of said ejecting mechanism, of means tending at each operation to move said slide over a constant path, means for stopping said slide in any one of a number of spaced positions and means for giving said slide an additional half space of movement.

36. In a machine of the class described, the combination with change delivery mechanism, of a change selecting mechanism controlling same, said selecting mechanism having two sets of graduations thereon, and a circumferential portion of reduced diameter opposite one set of graduations, substantially as described.

37. In a machine of the class described, the combination with change delivery devices, of a selecting mechanism controlling the delivery of change by said devices, said selecting mechanism comprising a cylinder, having two sets of steps, and also having a circumferential portion of reduced diameter in axial line with one of said sets of graduations.

38. In a machine of the class described, the combination with a change selecting mechanism, and a gear movable therewith, of two gears on opposite sides of said first gear, means connecting said outside gears so that they move in opposite directions, means for driving said connecting means, and means for connecting the said outside gears successively to the first mentioned gear.

39. In a machine of the class described, the combination with a change selecting mechanism, and a gear for driving same, of two gears on opposite sides of said first gear, connections between said outside gears such that they move equivalently but in opposite directions, keys for driving said connections, a pinion, and means for shifting same so as to connect the two outside gears successively to the driving gear.

40. In a machine of the class described, a change determining device, and a controlling mechanism for same, comprising a cylinder formed with two circumferential grooves, the edges of said grooves being parallel except at opposite ends of a diameter, substantially as described.

41. In a machine of the class described, the combination with change delivering mechanism having a fixed path, of a coin support, means permitting differential lowering of said support, to bring a desired number of coins into the path of the delivering mechanism, and change selecting devices controlling said means.

42. In a machine of the class described, the combination with change delivering mechanism having a fixed path, of a coin support, a lever carrying said support, means for releasing said lever at each operation of the machine, and change selecting mechanism for determining the extent of movement of said lever when the lever is released.

43. In a machine of the class described, the combination with a change selecting device, of a key, and connections whereby successive operations of said key may cause movement of said change selecting device in opposite directions.

44. In a machine of the class described, the combination with a change selecting device, of a key, and connections whereby successive actuations of said key cause said selecting device to be adjusted in contrary senses.

45. In a machine of the class described, the combination with a change selecting device, of a hand operated element, connections whereby said element actuates said selecting device, with means for shifting said connections at each actuation of said hand operated element to cause adjustment of said selecting device in opposite senses at the next actuation thereof.

46. In a machine of the class described, the combination with a selecting device, of a hand operated element, and reversible connections between said hand operated element and said selecting device.

47. In a machine of the class described, the combination with a change selecting device, of a hand operated element, connections whereby successive actuations of said hand operated element may cause adjustment of said change selecting device in opposite senses, and an ejecting device controlled by said selecting device.

48. In a machine of the class described, the combination with a change selecting device, of a key, reversible connections between said key and selecting device, and a change ejecting device controlled by said selecting device.

49. In a machine of the class described, the combination with a change selecting device, of a key, connections driven by said key including elements movable in opposite directions, and means for connecting said elements successively to said change selecting device.

50. In a machine of the class described, the combination with a change selecting device, of a key, connections driven by said key including elements movable in opposite senses, and a single element movable to connect said elements successively to said change selecting device.

51. In a machine of the class described, the combination with a change selecting device having graduations, of a hand operated element, connections controlled by said hand operated element, including driving devices movable in opposite directions, and means for connecting said driving devices successively to said change selecting device.

52. In a machine of the class described, the combination with a change selecting device having graduations, of a hand operated element, driving mechanism controlled as to extent of movement by said hand operated element, and including oppositely moving gears, and means for connecting said gears to said selecting device.

53. In a machine of the class described the combination with a change selecting device having graduations, and a gear for driving said selecting device, a key, mechanism driven by said key and including gears moving in opposite senses, devices for connecting said first gear to said latter gears in succession and a change delivering device controlled by said change selecting device.

54. In a machine of the class described, the combination with manipulative devices, of a change selecting device under control of said manipulative devices, and comprising a cylinder having a set of steps and having a circumferential groove, a change determining device positioned to engage said cylinder in the plane of the said groove, and a change determining slide movable to engage any one of said steps.

55. In a machine of the class described, the combination with manipulative devices, of a change selecting device having its movement determined by said manipulative devices and provided with a set of graduations and a circumferential portion of different diameter, a change determining device positioned to engage said cylinder in the plane of said different diameter portion, and a second change determining device movable axially along said cylinder to engage any one of said steps.

56. In a machine of the class described, the combination with a change selecting device, and means for differentially positioning it, said selecting device comprising an element having a set of graduations and a portion of different size, of a change determining device positioned to engage said graduations, a second determining device movable to engage said different size portion, and change delivering devices controlled by said determining devices.

57. In a machine of the class described, the combination with a change selecting device comprising an element having a set of graduations, and means for positioning said selecting device, of a change determining device comprising an element having a constant excursion at each actuation, and a second element having notches and driven by the first element to an extent determined by said graduations, together with change delivering devices controlled by said notches.

58. In a machine of the class described, the combination with a change selecting device comprising an element having graduations equally spaced, of a change determining device comprising an element movable to engage any of said graduations, a second element having notches, and movable connecting means between said elements constructed to cause relative movement of said elements equal to one half a spaced graduation; together with change delivering means controlled by said notches.

59. In a machine of the class described, the combination with manipulative means and change selecting devices having connections to be positioned differentially by said manipulative means, of a series of ejectors, a main operating device permanently connected to all said ejectors and operating said ejectors at each actuation of said main operating device, and elements controlled by said selecting devices and positioned thereby to be in the path of and to thereby change the plane of movement of such of said ejectors as are desired to be ineffective.

60. In a machine of the class described, the combination with a change selecting device comprising a rotatable element having graduations, of a gear continuously connected to said selecting element, a pair of additional gears, and permanent connections between them constructed to compel movement of said gears in opposite directions, means for giving differential movements to said additional gears, devices for successively connecting said additional gears to said selecting device gear, and change delivering mechanism controlled by said selecting device.

61. In a machine of the class described, the combination with a change selecting device having graduations, of a driving gear therefor permanently connected thereto, a pair of additional gears, with connections between said gears compelling movement thereof in opposite senses, means for moving said additional gears differentially, devices for connecting said additional gears in succession to said driving gear, and change delivering mechanism controlled by said selecting device.

62. In a machine of the class described, the combination with a change selecting device having graduations of a driving gear connected thereto, additional gears, with connections between said gears compelling movement thereof in opposite directions, keys, having connections to drive said additional gears differentially, devices for connecting said additional gears successively to said driving gear, and change delivering mechanism controlled by said selecting device.

63. In a machine of the class described, the combination with a change selecting device, of a driving device connected thereto, a pair of actuating elements with connections between said elements compelling movement thereof in opposite directions, means for moving said actuating elements differently, devices for connecting said actuating elements in succession to said driving device, and change delivering mechanism controlled by said selecting device.

64. In a machine of the class described, the combination with a change selecting device, having graduations, of a driving device connected thereto, a pair of actuating elements, with connections between said elements compelling movement thereof in opposite directions, keys connected to cause differential movement of said actuating elements, devices for connecting said driving device to each of said actuating elements in succession, and change delivering mechanism controlled by said selecting device.

65. In a machine of the class described, the combination with a change selecting device, having graduations, of a driving gear connected thereto, a pair of actuating gears for said driving gear, having permanent connections between said gears compelling movement thereof in opposite directions, and being positioned on opposite sides of said driving gear, keys connected to cause differential movement of said actuating gears, means for connecting said actuating gears in succession to said driving gear, and change delivering mechanism controlled by said selecting device.

66. In a machine of the class described, the combination with a change selecting device including an element having graduations, of means for moving it in either direction from a normal central position, whereby to determine the amount of change, oppositely positioned elements constructed to engage a part of said selecting device, a main operating mechanism, and a pair of arms actuated by said mechanism and constructed to engage and move corresponding portions of said oppositely positioned elements.

67. In a machine of the class described, the combination with a change selecting device, including an element having graduations, of means for moving it in either direction from a normal central position, whereby to determine the amount of change, a pair of coaxially arranged levers having arms extending on opposite sides of an element of said selecting device, a main operating mechanism, and connected arms actuated by said main operating mechanism and positioned to engage and move the other arms of said levers.

68. In a machine of the class described, the combination with a change selecting device, and means for moving it from a normal central position in either direction, whereby to determine the amount of change, a pair of coaxially positioned levers having arms extending to opposite sides of an element of said selecting device, a main operating mechanism including a cam, connected arms moved by said cam and positioned to engage and move the other arms of said levers, and means for withdrawing said connected arms from said lever arms whereby to permit selecting movement of said levers.

69. In a machine of the class described, the combination with denominational change selecting devices, and means for differentially adjusting them in opposite directions from a normal zero position, of change delivering devices controlled by said selecting devices, and devices, actuated by the change selecting device of highest denomination as it moves from its normal zero position in a subtracting direction, for preventing effective operation of said change delivering devices.

70. In a machine of the class described, the combination with denominational change selecting devices, and means for differentially adjusting them in opposite directions from a normal zero position, of change delivering devices controlled by said selecting devices, arms constructed to be positioned to prevent effective operation of said delivering devices, and means, movable with said selecting device of highest denomination, and effective as said selecting device moves from its normal zero position in a subtracting direction, to position said arms to prevent said effective operation.

71. In a machine of the class described, the combination with a change determining device, of a dimes selecting device having connections constructed to permit movement of said determining device to extents varying by equal amounts, and a pennies selecting device having connections constructed to permit an additional movement of said determining device to an extent of one half of one of said amounts.

72. In a machine of the class described, the combination with a change determining device capable of movement through extents varying by equal amounts, of a dimes change selecting device having connections constructed to limit the movement of said determining device to extents varying by said equal amounts, and a pennies change selecting device having connections constructed to increase the movement of said determining device by one half of one of said equal amounts.

73. In a machine of the class described, the combination with a change determining device, and means for moving it in steps calculated in extent to give change in even dimes, of additional means constructed to cause a movement of said determining device calculated to vary the amount of change determined by said first means by a half dime.

74. In a machine of the class described, the combination with a change determining device, of a bank of "dimes" keys, a "dimes" change selector, controlled by said "dimes" keys and having connections constructed to limit the movement of said determining device to extents proportional to change due in dimes, a "pennies" change selector with means for setting it, and connections from said pennies selector constructed to vary the movement of said determining device proportional to a half dime of change.

75. In a machine of the class described, the combination with ejectors for half dollars, quarter dollars, and dimes, of a change selector having two sets of equivalent graduations positioned to control operation of the quarter dollar and the dime ejectors, said selector also having a portion positioned, relative to one of said sets of graduations only, to control operation of the half dollar ejector.

In testimony whereof I affix my signature in the presence of two witnesses.

EDWARD J. VON PEIN.

Witnesses:
  Roy C. Glass,
  Carl I. Benst.